United States Patent [19]

Mangiavacchi

[11] Patent Number: 4,478,591

[45] Date of Patent: Oct. 23, 1984

[54] LUBRICATING DEVICE, IN PARTICULAR FOR A UNIVERSAL JOINT SPIDER

[75] Inventor: Jacques Mangiavacchi, Poissy, France

[73] Assignee: Glaenzer Spicer, Poissy, France

[21] Appl. No.: 453,956

[22] Filed: Dec. 28, 1982

[30] Foreign Application Priority Data

Jan. 7, 1982 [FR] France .............................. 82 00127

[51] Int. Cl.³ .............................................. F16D 3/26
[52] U.S. Cl. ........................................ 464/14; 464/131
[58] Field of Search ....................... 464/7, 11, 14, 112, 464/128, 131, 905; 137/843, 854; 184/109

[56] References Cited

U.S. PATENT DOCUMENTS

| | | | |
|---|---|---|---|
| 1,968,787 | 7/1934 | Slaght et al. | 464/14 |
| 2,912,999 | 11/1959 | Kersh | 137/843 X |
| 3,470,711 | 10/1969 | Kayser | 464/14 |
| 3,832,865 | 9/1974 | Lewis | 464/14 |

FOREIGN PATENT DOCUMENTS

| | | | |
|---|---|---|---|
| 1500080 | 5/1969 | Fed. Rep. of Germany . | |
| 2104477 | 4/1972 | France . | |
| 317990 | 8/1929 | United Kingdom | 464/14 |
| 2001151 | 1/1979 | United Kingdom . | |
| 211965 | 2/1968 | U.S.S.R. | 464/14 |

Primary Examiner—Stuart S. Levy
Assistant Examiner—Daniel P. Stodola
Attorney, Agent, or Firm—Wenderoth, Lind & Ponack

[57] ABSTRACT

Each trunnion of a spider is provided with an axial lubricating conduit having an outer portion forming a reservoir of increased diameter. Each conduit contains a combined device having an upstream part forming a constricted passage with the narrow portion of the conduit and an intermediate part in the form of a skirt and forming a stop valve. In order to ensure the positioning of this device, the skirt cooperates with a shoulder of the conduit, and a third part of the device cooperates with the end of an associated bearing bush. In this way, formation of air bubbles in the course of the filling of the conduits is avoided and the lubricant is retained in the reservoir during the course of operation.

10 Claims, 2 Drawing Figures

LUBRICATING DEVICE, IN PARTICULAR FOR A UNIVERSAL JOINT SPIDER

DESCRIPTION

Background of the Invention

The invention relates to a lubricating device, in particular for a universal joint spider, of the type comprising a conduit which communicates with an inlet for lubricant under pressure.

In universal joints, a conduit extends through each trunnion of the spider and usually opens onto the end of the associated bearing bush by way of a portion of enlarged diameter constituting a reservoir. When filling with the lubricant, the pressure provided by the lubricant pump is such that the lubricant is projected onto the ends of the bearing bush without completely filling the reservoir of the spider. The lubricant then continues its travel along each bearing bush and the needles of the rolling bearing and traps a certain amount of air under pressure in the reservoir. The filling is then incomplete and may be found to be insufficient in use, the air under pressure moreover accentuating the initial losses of lubricant.

Further, in the course of the rotation of the joint, a part of the lubricating grease contained in the conduits is discharged under the effect of centrifugal force until a balance is reached between the interior of the reservoirs and the interior chamber of the rolling bearings, which corresponds as a rule to a filling of the reservoir from the end of the bearing bushes to the region of the sealing devices of the latter.

However, in operation, the temperature of the universal joint may rise considerably owing to the temperature of the neighbouring elements (engine, exhaust pipe, etc.), and this increases the fluidity of the lubricant within the spider. Consequently, during periods of inactivity after operation, there is always at least one trunnion which is drained under the effect of gravity into the opposite trunnion located below. Then, when the joint again starts to rotate, the lubricant contained in the lower trunnions does not return into the original trunnions. Indeed, the excess lubricant is discharged by way of the sealing devices under the action of the centrifugal force. The level of the lubricant is therefore re-established in the region of the seals in the considered trunnions, whereas the trunnion or trunnions which were previously drained contain practically no lubricant.

It will be understood that with a repetition of this phenomenon, a spider could rapidly be drained of a large part of its lubricant.

SUMMARY OF THE INVENTION

An object of the invention is to provide a lubricating device which ensures very cheaply a complete and durable filling of the conduit, ie. without an air bubble.

The invention therefore provides a lubricating device of the aforementioned type, wherein there are disposed in the conduit combined means forming a constricted passage and a stop valve, these means comprising a first part whose section is slightly less than the section of the associated portion of the conduit, and a second part forming a flexible skirt extending in the downstream direction and having a diameter at rest which exceeds the diameter of the associated portion of the conduit, and the conduit includes means for retaining such means during the filling of the conduit.

The aforementioned combined means may advantageously comprise a moulded member of plastics material comprising, in succession, the first part, the skirt and a third part which projects from the skirt and is adapted to bear against a transverse surface onto which the conduit opens.

Another object of the invention is to provide a universal joint, of the type comprising a spider which connects two fork elements, each trunnion of which spider carries a bearing bush, the spider being provided with a lubrication connector which communicates with four radial conduits, each of which opens onto the end of a bearing bush, wherein each conduit is part of a lubricating device such as defined hereinbefore.

BRIEF DESCRIPTION OF THE DRAWINGS

The invention is described hereinafter in more detail with reference to the accompanying drawings which show only one embodiment of the invention and wherein.

DETAILED DESCRIPTION OF THE INVENTION

Figure 1:
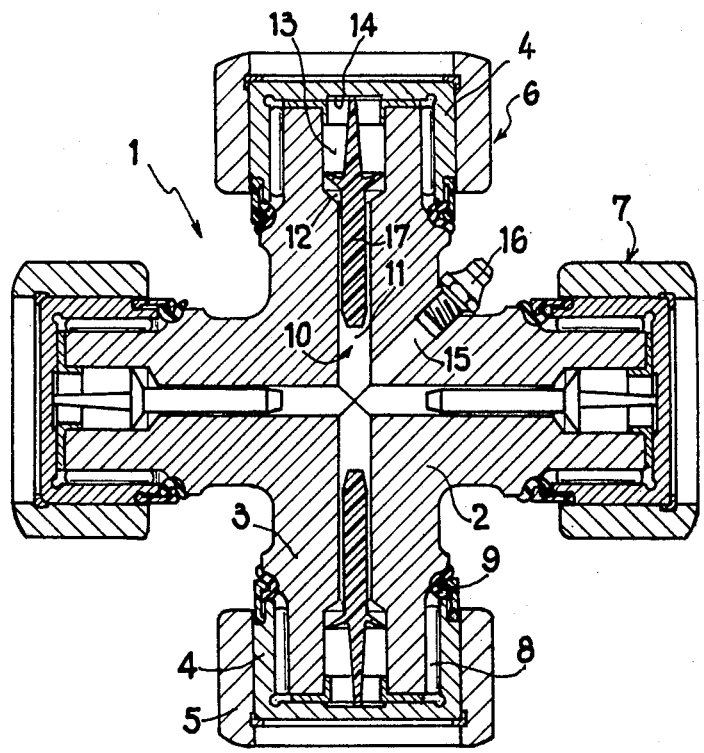
FIG. 1 is a sectional view of a universal joint according to the invention.
Figure 2:
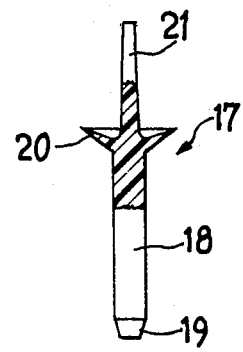
FIG. 2 is a partial sectional view of a part of this universal joint.

The universal joint 1 shown in FIG. 1 comprises a spider 2 each trunnion 3 of which carries a bearing bush 4 which is connected to one end 5 of one of the two fork elements 6, 7 of the joint. Each bearing bush 4 is rotatably mounted on its trunnion 3 by a needle bearing 8, the sealing being ensured by a sealing device 9 located at the inner end of the bearing bush 4.

Radially extending from the center of the spider 2 are four lubricating conduits 10 each of which is coaxial with a trunnion 3. Each conduit 10 comprises an inner portion 11 of small diameter which extends roughly to the region of the corresponding sealing device 9, and then a frustoconical shoulder 12 which connects this portion 11 to an outer portion 13 of larger diameter. The portion 13 constitutes a lubricant reservoir and opens onto the end surface of the trunnion 3, ie. directly onto the end 14 of the bearing bush 4.

Extending from the center of the spider 2 is moreover an additional conduit 15 which communicates with the exterior of the spider between two trunnions 3 by way of a connector 16.

Disposed in each conduit 10 is a member 17, preferably moulded from a plastics material, which comprises three successive coaxial parts:

a cylindrical inner part 18 whose diameter is slightly less than the diameter of the portion 11 of the conduit and which has a frustoconical nose portion 19;

a skirt or flexible diaphragm 20 having a V-shaped section and extending from the outer end of the part 18 and diverging outwardly, ie. away from this part 18, to a maximum diameter exceeding the diameter of the reservoir 13 of the conduit 10; and an outer part 21 which extends outwardly from the center of the skirt 20, axially projects from the latter and has a small diameter, eg. less than the diameter of the part 18.

The member 17 is inserted in the conduit 10 before the bearing bush 4 is placed in position. After assembly, its part 18 is received almost fully in the portion 11 of the conduit of which it occupies the major part of the section. The skirt 20 cooperates frictionally with the wall of the reservoir 13 of the conduit, which bends it slightly, and is located at a short distance from the shoulder 12, and consequently outwardly of the sealing device 9. Part 21 abuts against the end 14 of the bearing bush 4.

When the lubricant is introduced under pressure by way of the connector 16 and the conduit 15, the constricted passage constituted by the part 18 retards the stream of lubricant in each conduit 10. The lubricant retarded in this way reaches the skirt 20, moves the latter away from the wall of the reservoir 13 and thus reaches the reservoir which it gradually fills by expelling any air contained therein. During the filling operation the member 17 is retained axially by the abutment of its part 21 against the end of the bearing bush.

When the filling of the reservoir 13 and the needle bearing 8 has terminated, the injection of the lubricant is stopped. The skirt 20 once again applies itself against the wall of the reservoir 13 and performs the function of a stop valve which prevents the lubricant, even when the latter is rendered very fluid by a rise in temperature, from passing from the reservoir 13 into the portion 11 of the conduit and thence into another conduit 10.

Thus, in the course of operation, after a first partial discharge of lubricant produced by centrifugal force, each conduit 10 is filled up to the region of the sealing device 9 (in travelling toward the center of the spider), ie. in the considered embodiment, up to a little beyond the skirt 20. When stationary, only the amount of lubricant located beyond the skirt 20 can pass into another trunnion 3 located at a lower position. After a certain number of utilization of the universal joint, there is consequently obtained a stabilization of the filling of the reservoir 13 in the region of the skirt 20 of each trunnion. The consumption of lubricant on the part of the universal joint is thus considerably reduced.

In the course of operation, the shoulder 12 performs the function of retaining means for the member 17 in the direction toward the lubricant inlet 15-16.

It will be understood that the invention may be applied to the lubrication of mechanisms different from a universal joint.

Having now described my invention what I claim as new and desire to secure by Letters Patent is:

1. A lubricating arrangement comprising:
   a member having therein a conduit including a first portion adapted to receive from a first end thereof a supply of lubricant and a second portion having a first end connected to a second end of said first portion, said second portion having a diameter greater than said first portion;
   a member defining a surface extending transverse to said conduit at a second end of said second portion of said conduit; and
   means for allowing the restricted flow of lubricant from said first portion of said conduit to said second end of said second portion of said conduit and for preventing the flow of lubricant in the reverse direction, said means comprising a solid member including a first part having a diameter less than the diameter of said first portion of said conduit, a second part integral with said first part and in the form of a flexible skirt extending outwardly from said first part and having an outer diameter greater than said diameter of said second portion of said conduit, and a third part integral with said first and second parts and extending axially therefrom, said solid member being positioned in said conduit such that:

said first part of said solid member fits in said first portion of said conduit and defines therewith a constricted passage opening into said second portion of said conduit;
   said second part of said solid member is positioned in said second portion of said conduit with the outer edge of said skirt in frictional contact with the wall of said member defining said second portion; and
   said third part of said solid member is positioned in said second portion of said conduit and abuts against said transverse surface.

2. A lubricating arrangement according to claim 1, wherein said skirt is interposed between said first part and said third part.

3. A lubricating arrangement according to claim 1, wherein said conduit further comprises means for retaining said skirt in said second portion of said conduit.

4. A lubricating arrangement according to claim 1, wherein said first part is located upstream of said second part relative to the direction of lubricant supply from said first end of said first portion of said conduit, and said conduit further comprises means for retaining said solid member in a downstream direction relative to said direction of lubricant supply, said diameter of said skirt exceeds said diameter of said first part of said solid member, and said retaining means comprises a shoulder interconnecting said first and second portions of said conduit.

5. A lubricating arrangement according to claim 1, wherein said solid member comprises a single member formed of a flexible material.

6. A lubricating arrangement according to claim 1, wherein said solid member comprises a single member formed of a flexible plastic material.

7. A lubricating arrangement according to claim 1, wherein said skirt has a generally frusto-conical configuration and diverges in a direction toward said second end of said second portion of said conduit.

8. In a universal joint spider structure for interconnecting two fork elements of a universal joint, said structure being of the type including a spider having a plurality of trunnions, each said trunnion carrying a bearing bush having an end wall extending transversely of said trunnion, connector means for supplying lubricant to said spider, each said trunnion having extending therethrough a conduit including a first portion having a first end connected to said connector means and a second portion having a first end connected to a second end of said first portion and a second end opening at the respective said bearing bush end wall, said second portion having a diameter greater than said first portion, the improvement comprising, for each said conduit, means for allowing the restricted flow of lubricant from said first portion of said conduit to said second end of said second portion of said conduit and for preventing the flow of lubricant in the reverse direction, said means comprising:
   a solid member including a first part having a diameter less than the diameter of said first portion of said conduit, a second part integral with said first part and in the form of a flexible skirt extending outwardly from said first part and having an outer diameter greater than said diameter of said second portion of said conduit, and a third part integral with said first and second parts and extending axially therefrom; and
   said solid member being positioned in said conduit such that:

said first part of said solid member fits in said first portion of said conduit and defines therewith a constricted passage opening into said second portion of said conduit;

said second part of said solid member is positioned in said second portion of said conduit with the outer edge of said skirt in frictional contact with the wall of said member defining said second portion; and said third part of said solid member is positioned in said second portion of said conduit and abuts against said bearing bush end wall.

9. The improvement according to claim 8, wherein each said skirt is interposed between the respective said first part and the respective said third part of the respective said solid member.

10. The improvement according to claim 8, wherein each said skirt has a generally frusto-conical configuration and diverges in a direction toward the respective said bearing bush end wall.

* * * * *